United States Patent
Washicko et al.

(10) Patent No.: US 7,447,574 B1
(45) Date of Patent: Nov. 4, 2008

(54) IN-VEHICLE WIRING HARNESS WITH MULTIPLE ADAPTORS FOR AN ON-BOARD DIAGNOSTIC CONNECTOR

(75) Inventors: Paul L. Washicko, Carlsbad, CA (US); Robert Hunt, Vista, CA (US)

(73) Assignee: HTI IP, LLC, New York, NY (US)

( * ) Notice: Subject to any disclaimer, the term of this patent is extended or adjusted under 35 U.S.C. 154(b) by 0 days.

(21) Appl. No.: 11/799,848

(22) Filed: May 3, 2007

Related U.S. Application Data

(62) Division of application No. 10/831,952, filed on Apr. 26, 2004, now Pat. No. 7,225,065.

(51) Int. Cl.
*G01M 17/00* (2006.01)
*G01M 15/00* (2006.01)
*G06F 7/00* (2006.01)

(52) U.S. Cl. .............. 701/29; 701/33; 701/36; 73/116; 73/117.3

(58) Field of Classification Search .......... 701/29, 701/33, 36; 307/9.1, 10.1; 73/116, 117.3
See application file for complete search history.

(56) References Cited

U.S. PATENT DOCUMENTS

| | | | |
|---|---|---|---|
| 3,748,894 A | 7/1973 | White et al. | |
| 4,258,421 A | 3/1981 | Juhasz et al. | |
| 4,602,127 A | 7/1986 | Neely et al. | |
| 4,690,475 A | 9/1987 | McElroy | |
| 4,694,408 A | 9/1987 | Zaleski | |
| 4,926,330 A | 5/1990 | Abe et al. | |
| 4,956,777 A | 9/1990 | Cearley et al. | |
| 5,003,317 A | 3/1991 | Gray et al. | |
| 5,026,293 A | 6/1991 | Wilson | |
| 5,050,080 A | 9/1991 | Abe | |
| 5,157,610 A | 10/1992 | Asano et al. | |
| 5,223,844 A | 6/1993 | Mansell et al. | |

(Continued)

FOREIGN PATENT DOCUMENTS

CA 2133673 A1 10/1994

(Continued)

OTHER PUBLICATIONS

Disclosed Anonymously, Abstract, "Vehicle Diagnostic Performed via the Internet," RD-42261; *Research Disclosure*, p. 815, Jun. 1999.

(Continued)

*Primary Examiner*—Yonel Beaulieu
(74) *Attorney, Agent, or Firm*—Stephen C. Glazier; K&L Gates LLP

(57) ABSTRACT

An embodiment provides a wiring harness that connects a telematics device to a host vehicle. One embodiment of the wiring harness may include: 1) a cable featuring a plurality of wires; 2) a first connector featuring a snap-on adaptor that attaches to a connector core with a pin configuration that mates with a diagnostic scan tool; 3) a second connector that connects to an in-vehicle diagnostic system; and 4) a third connector that connects to the telematics device. A wiring kit embodiment and method embodiments for coupling a telematics device to a host vehicle are also disclosed.

6 Claims, 9 Drawing Sheets

U.S. PATENT DOCUMENTS

| | | | |
|---|---|---|---|
| 5,289,378 A | 2/1994 | Miller et al. |
| 5,343,906 A | 9/1994 | Tibbals, III |
| 5,442,553 A | 8/1995 | Parrillo |
| 5,450,321 A | 9/1995 | Crane |
| 5,463,567 A | 10/1995 | Boen et al. |
| 5,473,540 A | 12/1995 | Schmitz |
| 5,479,479 A | 12/1995 | Braitberg et al. |
| 5,491,486 A | 2/1996 | Welles, II et al. |
| 5,519,621 A | 5/1996 | Wortham |
| 5,532,927 A | 7/1996 | Pink et al. |
| 5,537,336 A | 7/1996 | Joyce |
| 5,550,551 A | 8/1996 | Alesio |
| 5,555,498 A | 9/1996 | Berra et al. |
| 5,574,427 A | 11/1996 | Cavallaro |
| 5,586,130 A | 12/1996 | Doyle |
| 5,619,412 A | 4/1997 | Hapka |
| 5,633,645 A | 5/1997 | Day |
| 5,636,122 A | 6/1997 | Shah et al. |
| 5,671,141 A | 9/1997 | Smith et al. |
| 5,673,305 A | 9/1997 | Ross |
| 5,680,328 A | 10/1997 | Skorupski et al. |
| 5,732,074 A | 3/1998 | Spaur et al. |
| 5,737,215 A | 4/1998 | Schricker et al. |
| 5,739,761 A * | 4/1998 | Kobayashi .................. 701/35 |
| 5,750,886 A * | 5/1998 | Lambert et al. ............ 73/117.3 |
| 5,754,965 A | 5/1998 | Hagenbuch |
| 5,758,300 A | 5/1998 | Abe |
| 5,774,828 A | 6/1998 | Brunts et al. |
| 5,781,101 A | 7/1998 | Stephen et al. |
| 5,781,871 A | 7/1998 | Mezger et al. |
| 5,797,134 A | 8/1998 | McMillan et al. |
| 5,798,647 A | 8/1998 | Martin et al. |
| 5,808,907 A | 9/1998 | Shetty et al. |
| 5,815,071 A | 9/1998 | Doyle |
| 5,828,585 A | 10/1998 | Welk et al. |
| 5,844,473 A | 12/1998 | Kaman |
| 5,850,209 A | 12/1998 | Lemke et al. |
| 5,884,202 A | 3/1999 | Arjomand |
| 5,928,292 A | 7/1999 | Miller et al. |
| 5,941,918 A | 8/1999 | Blosser |
| 5,964,821 A | 10/1999 | Brunts et al. |
| 5,987,377 A | 11/1999 | Westerlage et al. |
| 6,020,654 A | 2/2000 | Chutorash |
| 6,064,970 A | 5/2000 | McMillan et al. |
| 6,088,648 A | 7/2000 | Shah et al. |
| 6,104,988 A | 8/2000 | Klarer |
| 6,140,969 A | 10/2000 | Lindenmeier et al. |
| 6,141,611 A | 10/2000 | Mackey et al. |
| 6,141,710 A | 10/2000 | Miesterfeld |
| 6,144,916 A | 11/2000 | Wood, Jr. et al. |
| 6,154,658 A | 11/2000 | Caci |
| 6,167,426 A | 12/2000 | Payne et al. |
| 6,202,008 B1 | 3/2001 | Beckert et al. |
| 6,208,948 B1 | 3/2001 | Klingler et al. |
| 6,225,898 B1 | 5/2001 | Kamiya et al. |
| 6,236,933 B1 | 5/2001 | Lang |
| 6,240,295 B1 | 5/2001 | Kennedy, III et al. |
| 6,240,365 B1 | 5/2001 | Bunn |
| 6,246,935 B1 | 6/2001 | Buckley |
| 6,263,268 B1 | 7/2001 | Nathanson |
| 6,278,921 B1 | 8/2001 | Harrison et al. |
| 6,285,953 B1 | 9/2001 | Harrison et al. |
| 6,292,718 B2 | 9/2001 | Staiger |
| 6,295,492 B1 | 9/2001 | Lang et al. |
| 6,338,152 B1 | 1/2002 | Fera et al. |
| 6,339,736 B1 | 1/2002 | Moskowitz et al. |
| 6,339,745 B1 | 1/2002 | Novik |
| 6,346,876 B1 | 2/2002 | Flick |
| 6,354,868 B1 | 3/2002 | Korczynski et al. |
| 6,356,205 B1 | 3/2002 | Salvo et al. |
| 6,356,823 B1 | 3/2002 | Iannotti et al. |
| 6,362,730 B2 | 3/2002 | Razavi et al. |
| 6,400,701 B2 | 6/2002 | Lin et al. |
| 6,405,106 B1 | 6/2002 | Sheth et al. |
| 6,408,232 B1 | 6/2002 | Cannon et al. |
| 6,429,773 B1 | 8/2002 | Schuyler |
| 6,442,460 B1 | 8/2002 | Larson et al. |
| 6,459,988 B1 | 10/2002 | Fan et al. |
| 6,477,452 B2 | 11/2002 | Good |
| 6,480,170 B1 | 11/2002 | Langley et al. |
| 6,487,479 B1 | 11/2002 | Nelson |
| 6,487,494 B2 | 11/2002 | Odinak et al. |
| 6,487,717 B1 | 11/2002 | Brunemann et al. |
| 6,496,777 B2 | 12/2002 | Tennison et al. |
| 6,502,030 B2 | 12/2002 | Hilleary |
| 6,505,106 B1 | 1/2003 | Lawrence et al. |
| 6,507,786 B2 | 1/2003 | Flick |
| 6,512,466 B2 | 1/2003 | Flick |
| 6,522,267 B2 | 2/2003 | Flick |
| 6,526,335 B1 | 2/2003 | Treyz et al. |
| 6,526,460 B1 | 2/2003 | Dauner et al. |
| 6,529,159 B1 | 3/2003 | Fan et al. |
| 6,552,682 B1 | 4/2003 | Fan |
| 6,556,889 B2 | 4/2003 | Rudick et al. |
| 6,556,905 B1 | 4/2003 | Mittelsteadt et al. |
| 6,564,127 B1 | 5/2003 | Bauerle et al. |
| 6,564,128 B2 | 5/2003 | Baird et al. |
| 6,580,916 B1 | 6/2003 | Weisshaar et al. |
| 6,594,576 B2 | 7/2003 | Fan et al. |
| 6,594,579 B1 | 7/2003 | Lowrey et al. |
| 6,604,032 B1 | 8/2003 | Möller |
| 6,604,033 B1 | 8/2003 | Banet et al. |
| 6,604,038 B1 | 8/2003 | Lesesky et al. |
| 6,609,051 B2 | 8/2003 | Fiechter et al. |
| 6,611,686 B1 | 8/2003 | Smith et al. |
| 6,611,739 B1 | 8/2003 | Harvey et al. |
| 6,611,740 B2 | 8/2003 | Lowrey et al. |
| 6,611,755 B1 | 8/2003 | Coffee et al. |
| 6,636,790 B1 | 10/2003 | Lightner et al. |
| 6,662,091 B2 | 12/2003 | Wilson et al. |
| 6,664,922 B1 | 12/2003 | Fan |
| 6,671,617 B2 | 12/2003 | Odinak et al. |
| 6,675,081 B2 | 1/2004 | Shuman et al. |
| 6,678,614 B2 | 1/2004 | McCarthy et al. |
| 6,687,587 B2 | 2/2004 | Kacel |
| 6,694,234 B2 | 2/2004 | Lockwood et al. |
| 6,701,233 B2 | 3/2004 | Namaky et al. |
| 6,718,425 B1 | 4/2004 | Pajakowski et al. |
| 6,732,031 B1 | 5/2004 | Lowrey et al. |
| 6,732,032 B1 | 5/2004 | Lowrey et al. |
| 6,738,697 B2 | 5/2004 | Breed |
| 6,751,452 B1 | 6/2004 | Kupczyk et al. |
| 6,751,479 B1 | 6/2004 | Knight |
| 6,754,485 B1 | 6/2004 | Obradovich et al. |
| 6,757,262 B1 | 6/2004 | Weisshaar et al. |
| 6,766,233 B2 | 7/2004 | Odinak et al. |
| 6,795,017 B1 | 9/2004 | Puranik et al. |
| 6,801,841 B2 | 10/2004 | Tabe |
| 6,809,659 B2 | 10/2004 | Flick et al. |
| 6,812,888 B2 | 11/2004 | Drury et al. |
| 6,832,140 B2 | 12/2004 | Fan et al. |
| 6,832,175 B2 | 12/2004 | Adachi et al. |
| 6,836,708 B2 | 12/2004 | Tripathi |
| 6,845,362 B2 | 1/2005 | Furuta et al. |
| 6,862,524 B1 | 3/2005 | Nagda et al. |
| 6,867,733 B2 | 3/2005 | Sandhu et al. |
| 6,879,894 B1 | 4/2005 | Lightner et al. |
| 6,882,313 B1 | 4/2005 | Fan et al. |
| 6,889,064 B2 | 5/2005 | Baratono et al. |
| 6,889,135 B2 | 5/2005 | Curatolo et al. |
| 6,892,131 B2 | 5/2005 | Coffee et al. |
| 6,895,444 B1 | 5/2005 | Weisshaar et al. |
| 6,907,330 B2 | 6/2005 | Eisenmann et al. |
| 6,922,566 B2 | 7/2005 | Puranik et al. |

| | | |
|---|---|---|
| 6,928,348 B1 | 8/2005 | Lightner et al. |
| 6,941,202 B2 | 9/2005 | Wilson et al. |
| 6,944,121 B1 | 9/2005 | Weste et al. |
| 6,947,760 B2 | 9/2005 | Weisshaar et al. |
| 6,947,816 B2 | 9/2005 | Chen |
| 6,956,501 B2 | 10/2005 | Kitson |
| 6,957,133 B1 | 10/2005 | Hunt et al. |
| 6,970,703 B2 | 11/2005 | Fuchs et al. |
| 6,973,324 B2 | 12/2005 | Weisshaar et al. |
| 6,988,033 B1 | 1/2006 | Lowrey et al. |
| 7,016,774 B2 | 3/2006 | Barber et al. |
| 7,034,710 B2 | 4/2006 | Falada et al. |
| 7,062,375 B2 | 6/2006 | Hatano |
| 7,072,668 B2 | 7/2006 | Chou |
| 7,092,803 B2 | 8/2006 | Kapolka et al. |
| 7,113,127 B1 | 9/2006 | Banet et al. |
| 7,155,321 B2 | 12/2006 | Bromley et al. |
| 7,174,243 B1 | 2/2007 | Lightner et al. |
| 7,225,065 B1 | 5/2007 | Hunt et al. |
| 7,228,211 B1 | 6/2007 | Lowrey et al. |
| 2001/0018628 A1 | 8/2001 | Jenkins et al. |
| 2001/0034609 A1 | 10/2001 | Dovolis |
| 2002/0016655 A1 | 2/2002 | Joao |
| 2002/0065698 A1 | 5/2002 | Schick et al. |
| 2002/0073170 A1 | 6/2002 | Hoffman et al. |
| 2002/0078458 A1 | 6/2002 | Furon et al. |
| 2002/0118222 A1 | 8/2002 | Fogarty |
| 2002/0140545 A1 | 10/2002 | Nietupski et al. |
| 2002/0150050 A1 | 10/2002 | Nathanson |
| 2002/0171650 A1 | 11/2002 | Prabhakaran |
| 2002/0173885 A1 | 11/2002 | Lowrey et al. |
| 2003/0093199 A1 | 5/2003 | Mavreas |
| 2003/0130005 A1 | 7/2003 | Weisshaar et al. |
| 2003/0130774 A1 | 7/2003 | Tripathi et al. |
| 2003/0147534 A1 | 8/2003 | Ablay et al. |
| 2004/0023645 A1 | 2/2004 | Olsen et al. |
| 2004/0044454 A1 | 3/2004 | Ross et al. |
| 2004/0075539 A1 | 4/2004 | Savoie et al. |
| 2004/0196182 A1 | 10/2004 | Unnold |
| 2005/0131729 A1 | 6/2005 | Melby et al. |
| 2005/0144318 A1 | 6/2005 | Chang |
| 2007/0069947 A1 | 3/2007 | Banet et al. |

FOREIGN PATENT DOCUMENTS

| | | |
|---|---|---|
| CA | 2372900 A1 | 5/2003 |
| EP | 0816820 A2 | 1/1998 |
| WO | WO 00/40038 A2 | 7/2000 |
| WO | WO 00/79727 A2 | 12/2000 |

OTHER PUBLICATIONS

Wilson et al., "Modular System for Multi-Parameter In-Line Machine Fluid Analysis," *Technology Showcase 2000*, pp. 78-85, Apr. 3-6, 2000.

Definition of "Chipset", printed from http://en.wikipedia.org/wiki/Chipset, Internet site, website accessed on Feb. 23, 2006, 1 page.

Di Genova et al., "Incorporation of Wireless Communications into Vehicle On-Board Diagnostic (OBD) Systems." Report No. SR00-01-03, prepared for California Air Resources Board by Sierra Research, Inc., Jan. 18, 2000, 172 pages.

40 CFR 51, Ch. I (Jul. 1, 2001 Edition), pp. 130-481.

40 CFR 85, Ch. I (Jul. 1, 2001 Edition), 143 pages.

Motorola, Inc., "Automotive ISO 9141 Serial Link Driver," Document MC333199/D, 1996, 12 pages.

D. John Oliver, Intel Corporation, "Implementing the J 1850 Protocol," 15 pages.

"$I^2C$," printed from http://www.nxp.com, Internet site, (associated with www.philipslogic.com), website accessed on Jun. 8, 2006, 3 pages.

"Qualcomm Chipset Solutions," printed from http://www.qualcomm.com, Internet site, website accessed on Jun. 8, 2006, 48 pages.

U.S. Appl. No. 09/776,083, filed Feb. 1, 2001.

U.S. Appl. No. 10/301,010, filed Nov. 21, 2002.

U.S. Appl. No. 10/440,596, filed May 19, 2003.

U.S. Appl. No. 10/614,665, filed Jul. 7, 2003.

U.S. Appl. No. 10/626,779, filed Jul. 24, 2003.

U.S. Appl. No. 10/626,810, filed Jul. 24, 2003.

U.S. Appl. No. 10/632,033, filed Jul. 31, 2003.

U.S. Appl. No. 10/823,478, filed Apr. 13, 2004.

U.S. Appl. No. 11/654,213, filed Jan. 17, 2007.

U.S. Appl. No. 11/784,053, filed Apr. 5, 2007.

U.S. Appl. No. 11/788,930, filed Apr. 23, 2007.

U.S. Appl. No. 11/796,372, filed Apr. 27, 2007.

Definition of "Chipset" printed from Webopedia, Internet site, Oct. 31, 2002, 3 pages.

Notice of Disclosure by HTI IP, LLC of Asserted Claims and Infringement Contentions and Document Production Accompanying Disclosure (Attachments: #1 Appendix Chart of Asserted Claims 6,636,790, #2 Appendix Chart of Asserted Claims 6,372,031, #3 Appendix Chart of Asserted Claims 6,611,740, 6:07-CV-00466-LED, entered Feb. 11, 2008, 76 pages.

U.S. Appl. No. 11/948,473 and Preliminary Amendment, filed Nov. 30, 2007.

U.S. Appl. No. 11/948,489 and Preliminary Amendment, filed Nov. 30, 2007.

U.S. Appl. No. 11/948,496 and Preliminary Amendment, filed Nov. 30, 2007.

U.S. Appl. No. 11/948,515 and Preliminary Amendment, filed Nov. 30, 2007.

* cited by examiner

IN-VEHICLE WIRING HARNESS WITH MULTIPLE ADAPTORS FOR AN ON-BOARD DIAGNOSTIC CONNECTOR

CROSS-REFERENCE TO RELATED APPLICATIONS

This application is a divisional of U.S. application Ser. No. 10/831,952 filed on Apr. 26, 2004 now U.S. Pat. No. 7,225,065.

BACKGROUND

1. Field

The present invention relates to vehicle wiring systems and components.

2. Description of the Invention Background

Vehicles, such as light-duty cars and trucks and heavy-duty tractor/trailers, can include 'telematics' systems that monitor the vehicle's location and diagnostic data. Such telematics systems typically include an in-vehicle telematics device that includes a conventional global positioning system ('GPS') that receives signals from orbiting satellites, and a processor that analyzes these signals to calculate a GPS 'fix'. The fix features location-based data such as a vehicle's latitude, longitude, altitude, heading, and velocity, and typically describes the vehicle's location with an accuracy of about 10 meters or better.

In addition to the GPS, telematics devices typically include a wireless transmitter that sends location-based data through a wireless network, and an Internet-accessible website that displays the data.

Telematics devices can also monitor the host vehicle's diagnostic system. As an example of a diagnostic system, most light-duty automobiles and trucks beginning with model year 1996 include an on-board diagnostic (OBD) system as mandated by the Environmental Protection Agency (EPA). OBD systems feature a network of in-vehicle sensors that monitor the vehicle's electrical, mechanical, and emissions systems, and in response generate data that are processed by the vehicle's engine control unit (ECU). The data are used, for example, to detect malfunctions or deterioration in the vehicle's performance. They are accessed from the ECU according to the following serial communication protocols: J1850 VPW (Ford); J1850 VPWM (General Motors); ISO 9141-2 (most Japanese and European vehicles); Keyword 2000 (some Mercedes and Hyundai vehicles); and CAN (a newer protocol used by many vehicles manufactured after 2004). Parameters within the data include vehicle speed (VSS), engine speed (RPM), engine load (LOAD), and mass air flow (MAF). The ECU can also generate diagnostic trouble codes (DTCs), which are 5-digit codes (e.g., 'P0001') indicating emissions-related problems with the vehicle.

Most vehicles manufactured after 1996 include a standardized, serial, sixteen-cavity connector, referred to herein as an 'OBD connector', that provides access to the above-mentioned data. The OBD connector serially communicates with the vehicle's ECU, and additionally provides power (approximately 12 volts) and ground. The OBD connector typically lies underneath the vehicle's dashboard. A conventional scan tool can be plugged into this OBD connector to retrieve diagnostic data from the vehicle's ECU.

While the core and pin-out of each OBD connector is universal and mandated by the EPA, the form factor, and particularly the plastic configuration around the connector's perimeter, typically varies by vehicle make. And even within a given make, the connector's form factor may vary for a given model.

Heavy-duty trucks typically include a diagnostic system, referred to herein as a 'truck diagnostic system', which is analogous to the OBD systems present in light-duty vehicles. Truck diagnostic systems typically operate a communication protocol called J1708/J1587 or CAN that collects diagnostic data from sensors distributed in the truck. As in light-duty vehicles, the truck's ECU processes these data, and then makes them available through a six or nine-pin connector, referred to herein as 'the truck diagnostic connector', typically located in the truck's interior. Again, a technician can obtain the data from the truck's ECU by plugging a conventional scan tool into the truck diagnostic connector.

In the past, a telematics device connected to the host vehicle's diagnostic connector was typically mounted within the vehicle. Unfortunately, such mounting arrangements make it convenient for thieves to simply remove or unplug the telematics device to thwart its vehicle tracking abilities.

In addition, during a repair process, the technician must unplug the telematics device from the vehicle's diagnostic connector so that a conventional scan can be plugged into that connector and retrieve diagnostic data from the vehicle's ECU. After the diagnostic material has been retrieved and the scan tool has been unplugged from the diagnostic connector, the technician must remember to reconnect the telematics device to the connector. The telematics device is rendered inoperative if the technician forgets to reconnect it to the OBD connector.

These are just a few of the problems associated with prior telematics and diagnostic monitoring systems employed in vehicles for monitoring the vehicle's location and diagnostic data.

SUMMARY

One embodiment of the present invention is directed to a wiring harness for connecting a telematics device to a host vehicle. In one embodiment, the wiring harness includes a plurality of electrical conductors and a first connector electrically coupled to at least some of the electrical conductors. The first connector is configured to be coupled to a diagnostic scan tool. A second connector is electrically coupled to at least some of the electrical conductors and is configured to be coupled to an in-vehicle diagnostic system. A third connector is coupled to at least some of the electrical conductors and is configured to be coupled to the telematics device.

Another embodiment of the present invention is directed to a wiring kit for connecting a telematics device to a host vehicle. In one embodiment, the wiring kit includes a wiring harness. The wiring harness may comprise an electrically conductive cable and a first connector which is in electrical contact with the cable and has a connector core. A second connector is also in electrical contact with the electrically conductive cable and is configured to connect to an in-vehicle diagnostic system. A third connector is in electrical contact with the cable and is configured for attachment to a telematics device. A plurality of adaptors are also included wherein each adaptor is configured to be selectively attached to the connector core.

Yet another embodiment of the present invention is directed to a wiring kit for electrically connecting a telematics device to an ECU of a vehicle. One embodiment includes an electrical cable and a first connector in electrical contact with the electrical cable. A plurality of adaptors may also be provided wherein each adaptor is selectively attachable to the first connector and wherein at least one adaptor is configured to facilitate electrically coupling the first connector to a core connector that corresponds to the diagnostic connector of the selected vehicle. A second connector is also mounted in electrical contact with the engine control unit of the selected vehicle control unit. A third connector is en electrical contact with the cable and is configured to be connected to the telematics device within the selected vehicle.

Another embodiment of the present invention is directed to a method for coupling a telematics device to a host vehicle. In one embodiment, the method includes coupling an electrical cable to an engine control unit of the vehicle. The electrical cable is coupled to the telematics device. A diagnostic connector is coupled to the electrical cable wherein the diagnostic connector is configured to interface with a diagnostic scan tool that corresponds to the vehicle.

Still another embodiment of the present invention includes a method for mounting a telematics device within a vehicle that has an on-board diagnostic unit for collecting diagnostic data. The on-board diagnostic unit is coupled to an original on-board diagnostic connector mounted in an accessible location within the vehicle to enable a diagnostic scan tool that has a connector which is unique to the type of vehicle to be coupled thereto to retrieve the diagnostic data. In one embodiment, the method includes mounting the telematics unit within the vehicle such that it is hidden from view within the vehicle. An electrical cable is coupled to the telematics unit. The electrical cable may be coupled to the telematics unit prior to or after the telematics unit has been mounted. The original on-board diagnostic connector is removed from the accessible location in which it was mounted. The electrical cable is coupled to the original on-board diagnostic connector. Another diagnostic connector capable of mating with the scan tool is coupled to the electrical cable. The another diagnostic connector is mounted or otherwise supported in the accessible location.

BRIEF DESCRIPTION OF DRAWINGS

The features and advantages of various embodiments of the present invention can be understood by reference to the following detailed description taken with the drawings.

DETAILED DESCRIPTION

Figure 1:
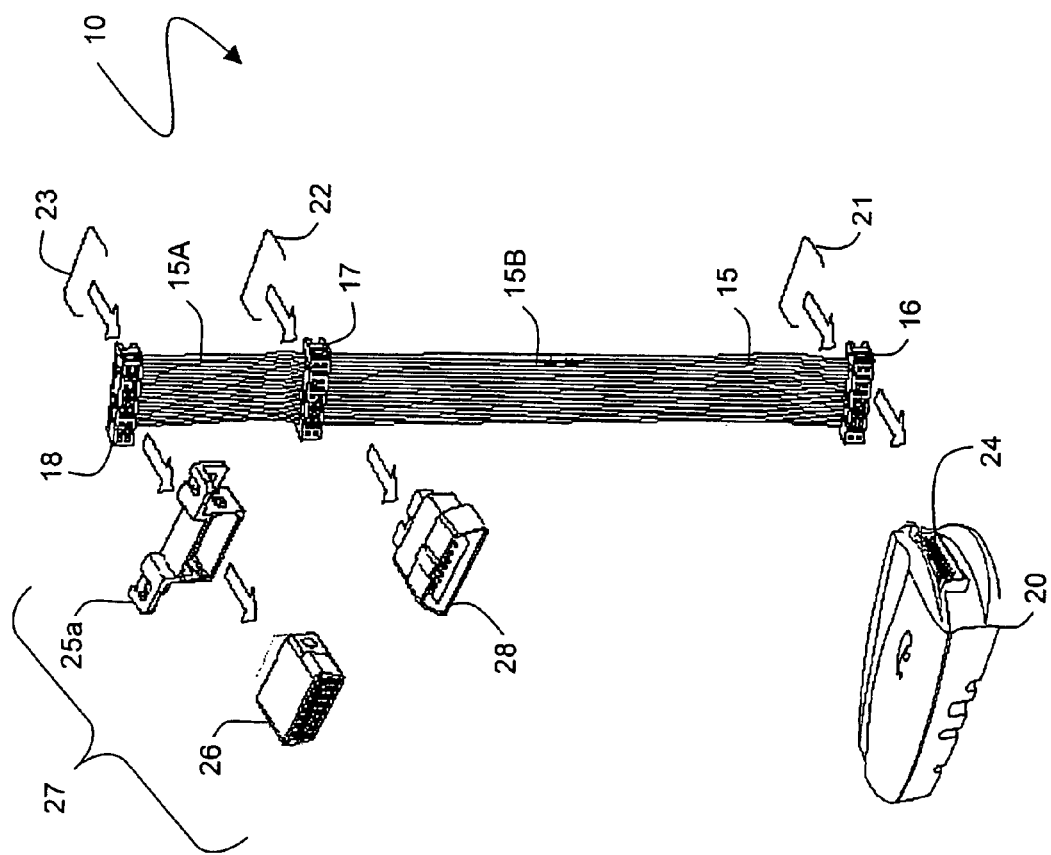
FIG. 1 is a three-dimensional side view of the wiring harness according to an embodiment of the invention, featuring an 'effective' OBD connector, that connects a telematics device to a host vehicle.

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

Various embodiments of the present invention provide a modular wiring harness that may be used to connect an in-vehicle telematics device to a host vehicle and the diagnostic system therein. In one embodiment, the wiring harness comprises a snap-on, configurable adaptor that snaps or is otherwise coupled onto a connector core. Once attached, the pieces form an 'effective OBD connector'. The wiring harness may be arranged to enable the telematics device to be effectively hidden under the dashboard while at the same time providing easy access to an OBD connector to obtain diagnostic information from the vehicle's ECU. It may be advantageous for the wiring harness to include a snap-on adaptor because, while the core and pin-out of each OBD connector is universal and mandated by the EPA, the form factors of these connectors typically vary by vehicle make and model.

As will be discussed in further detail below, to install one of the wiring harness embodiments of the invention, a technician removes the vehicle's original OBD connector from its location under the dash and connects it to a second connector portion of the harness. The technician then snaps or otherwise couples an effective OBD connector adaptor with the same form factor as the original OBD connector onto a first connector portion of the harness, and inserts the adaptor into the now-vacated original location of the original OBD connector. The technician may then secure the telematics device in a location within the vehicle that is not easily accessible or noticeable, and also connects the telematics device to a third connector portion of the harness. The technician may then deploy the antennae for the GPS and wireless transmitter of the telematics device. Data from the ECU can then be accessed through the original OBD connector, at the second connector portion, through the harness from the effective OBD connector adaptor at the first connector portion, or through the harness by the telematics device from the third connector portion.

In this configuration, both the effective OBD connector (now located under the dash in the original location of the original OBD connector) and the original OBD connector (now communicating with the telematics device through the harness) communicate serially with the host vehicle's ECU. The reader will appreciate that this configuration provides several advantages. First, it allows the vehicle's telematics device to both communicate with the vehicle's ECU and be hidden from view. This means the device is not visible to passengers within the vehicle, making it unobtrusive and effective for applications such as recovery of stolen vehicles. Second, the effective OBD connector adaptor, which is visible from within the vehicle, looks like the original OBD connector and therefore does not indicate that any telematics device is installed. This too aids recovery of stolen vehicles. Third, during a repair process, a technician can access the vehicle's diagnostic computer using an automotive scan tool without having to unplug the telematics device from the vehicle's original OBD connector. The technician simply plugs a scan tool into the effective OBD connector, which is easily accessed underneath the vehicle's dash, and then downloads diagnostic data from the vehicle's ECU.

By selecting the proper adaptor from a set of multiple adaptors, a technician can use the present invention as a universal wiring harness to install the telematics device in virtually any vehicle. This means it is not necessary to manufacture custom wiring harnesses for each type of vehicle. Companies installing the telematics device (e.g., automotive dealerships) can stock a single 'base' wiring harness (which can be relatively expensive) and multiple adaptors (which are relatively inexpensive). This is efficient for control of inventory. Alternatively, through a retail channel, a customer can purchase the telematics device, the base wiring harness, and multiple adaptors. In both cases, to install the telematics device, the installer simply selects an adaptor that matches the host vehicle's OBD connector, and snaps it or otherwise fastens it to the connector core to form the effective OBD connector. The installer then attaches the effective OBD connector to the wiring harness, installs the telematics device, and may choose to discard the un-used adaptors.

One or more of these features of the wiring harness complement basic advantages provided by the telematics system, described in detail below. For example, various embodiments of this system provide wireless, real-time transmission and analysis of diagnostic and location-based data, followed by analysis and display of these data by an Internet-accessible website. This makes it possible to characterize the vehicle's performance and determine its location in real-time from virtually any location that has Internet access. Diagnostic and location-based data may be complementary and, when analyzed together, can improve conventional services such as roadside assistance, vehicle-theft notification and recovery, and remote diagnostics. For example, the information can indicate a vehicle's location, its fuel level and battery voltage, and/or whether or not it has any active DTCs. Using this information, a call center can dispatch a tow truck with the appropriate materials (e.g., extra gasoline or tools required to repair a specific problem) to repair the vehicle accordingly. More applications of conventional telematics systems are found within the following U.S. patents, the disclosures of which are herein incorporated by reference: 1) U.S. Pat. No. 6,594,579; 2) U.S. Pat. No. 6,604,033; 3) U.S. Pat. No. 6,611,740; and 4) U.S. Pat. No. 6,636,790.

More specifically, one embodiment of the invention provides a wiring harness that connects a telematics device to a host vehicle. The wiring harness may include: 1) a cable featuring a plurality of wires; 2) a first connector featuring a snap-on adaptor that attaches to a connector core with a pin configuration that mates with a diagnostic scan tool; 3) a second connector that connects to an in-vehicle diagnostic system; and 4) a third connector that connects to the telematics device.

In at least some of the embodiments, the cable includes a first connector portion that mates to the first connector, and a second connector portion that mates with the second connector. The first and second connector portions, for example, can be IDC connectors. In other embodiments, the first connector further includes a first set of metal contacts that mate with a diagnostic scan tool, and a second set of metal contacts that mate with the first connector portion.

In one embodiment, the connector core includes sixteen metallized cavities and may be configured to mate with an OBD-II male connector. Similarly, the second connector may include sixteen metallized pins and be configured to mate with an OBD-II female connector. However, other cavity and pin arrangements could conceivably be employed depending upon the specific application.

Various embodiments of the present invention may be useful in a wide range of vehicles. Examples of such vehicles include, but are not limited to, automobiles, commercial equipment, light, medium and heavy-duty trucks, construction vehicles (e.g., front-end loaders, bulldozers, forklifts), powered sport vehicles (e.g., motorboats, motorcycles, all-terrain vehicles, snowmobiles, jet skis, and other powered sport vehicles), collision repair vehicles, marine vehicles, and recreational vehicles.

FIG. 1 shows a wiring harness 10 according to one embodiment of the invention that features a snap-on adaptor 25a chosen to match a form factor of the OBD connector present in a host vehicle. During an installation process, the snap-on adaptor 25a connects to an outer perimeter of an OBD-compliant connector core 26 to form an 'effective' OBD connector 27 that looks virtually identical to the OBD connector 36 present in the vehicle. In this embodiment, the effective OBD connector 27 is two-sided: one side includes a core 26 with sixteen OBD-compliant metallized cavities and a configuration that matches a standard OBD connector, while the second side features twenty pins (not shown in the figure) in a configuration that matches a standard IDC connector. A printed circuit board (not shown in the figure, but described in more detail with reference to FIG. 2) connects each cavity of the connector core 26 to a mating pin in the IDC connector. This may be accomplished during manufacturing. During installation of the wiring harness, the effective OBD connector 27 connects to a first connector portion 18 attached to the wiring harness 10. In this embodiment, the first connector portion 18 is a female, twenty-cavity IDC connector. A first clip 23 may be used to secure the effective OBD connector 27 to the first connector portion 18. In one embodiment, the clip 23 is fabricated from metal material. Other materials and arrangements could also be employed for the clip. In addition, if appropriate, the OBD connector 27 could conceivably be attached to the first connector portion 18 by other suitable fasteners and fastening arrangements such as screws or the like.

The wiring harness 10 is also attached to a second connector portion 17, which, in this embodiment, is identical in configuration to the first connector portion 18. The second connector portion 17 in this embodiment features a female twenty-cavity IDC connector. It mates with an OBD connector 28 that, in this embodiment, includes twenty male pins in an IDC pin-out on one side, and sixteen male pins in an OBD pin-out on the other side. A third connector portion 16, which, in this embodiment, is identical to the above-described first 18 and second 17 connector portions, connects to the in-vehicle telematics device 20 through twenty male pins in an IDC pin-out 24. Second and third clips (22, 21), respectively, secure the second and third connector portions (17, 16) to the male OBD connector 28 and telematics device 20. As described above, clips 21 and 22 may be fabricated from metal, although other clip materials and/or fastener arrangements could also be successfully employed. Also in this embodiment, a twenty-wire ribbon cable 15, which may include first 15A and second 15B portions, connects individual pins and provides electrical communication between the first 18, second 17, and third 16 connector portions.

Once all the above-mentioned connections are made, the wiring harness is fully operational and ready to install in the host vehicle. To do this, the vehicle's original female OBD connector 36 is removed from its location and connected to the male OBD connector 28. See FIG. 6 herein. Once secured, this connection facilitates transmission of power, ground, and the vehicle's diagnostic data, through a serial connection to the host vehicle's ECU and to the telematics device 20. The installer may then insert the effective OBD connector 27 into the vacated slot or mounting area that previously housed or otherwise supported the vehicle's original OBD connector 36. With this in place, a conventional automotive scan tool 70, once plugged into the effective OBD connector 27, can also download diagnostic information from the vehicle's ECU. To complete the installation, the third connector portion 16 is coupled to the telematics device 20 and the telematics device 20 and cable are secured underneath the vehicle's dash and hidden from view. If the telematics device 20 includes external antennae (e.g. for a wireless transmitter and GPS), these too are secured within the vehicle.

In this configuration, the telematics device 20 is not visible to passengers within the vehicle 12, making it unobtrusive and effective for applications such as recovery of stolen vehicles. Also, the effective OBD connector 27 looks like the original OBD connector 36, and is in the original location of the original OBD connector 36, so it is not obvious that any telematics device 20 has been installed. This further aids in recovering stolen vehicles. In addition, during a repair process, a technician can access the vehicle's diagnostic computer with an automotive scan tool 70, communicating through the effective OBD connector 27, without having to unplug the telematics device 20 from the original OBD connector 36. The technician simply plugs a scan tool 70 into the effective OBD connector 27, which is easily accessed underneath the vehicle's dash, and then downloads diagnostic data from the vehicle's ECU 35.

In one embodiment, at any given time, diagnostic data generated by the vehicle's ECU can only pass through the effective OBD connector or to the in-vehicle telematics device 20. It cannot be accessed simultaneously from both components. The in-vehicle telematics device 20, therefore, typically includes firmware that detects when a scan tool 70 is connected to the effective OBD connector 27. It then 'backs off' from the ECU so that it receives no data until the scan tool 70 is disconnected. In this way, the technician can download the vehicle's diagnostic data during a repair without having to disconnect the in-vehicle telematics device.

Figure 2:
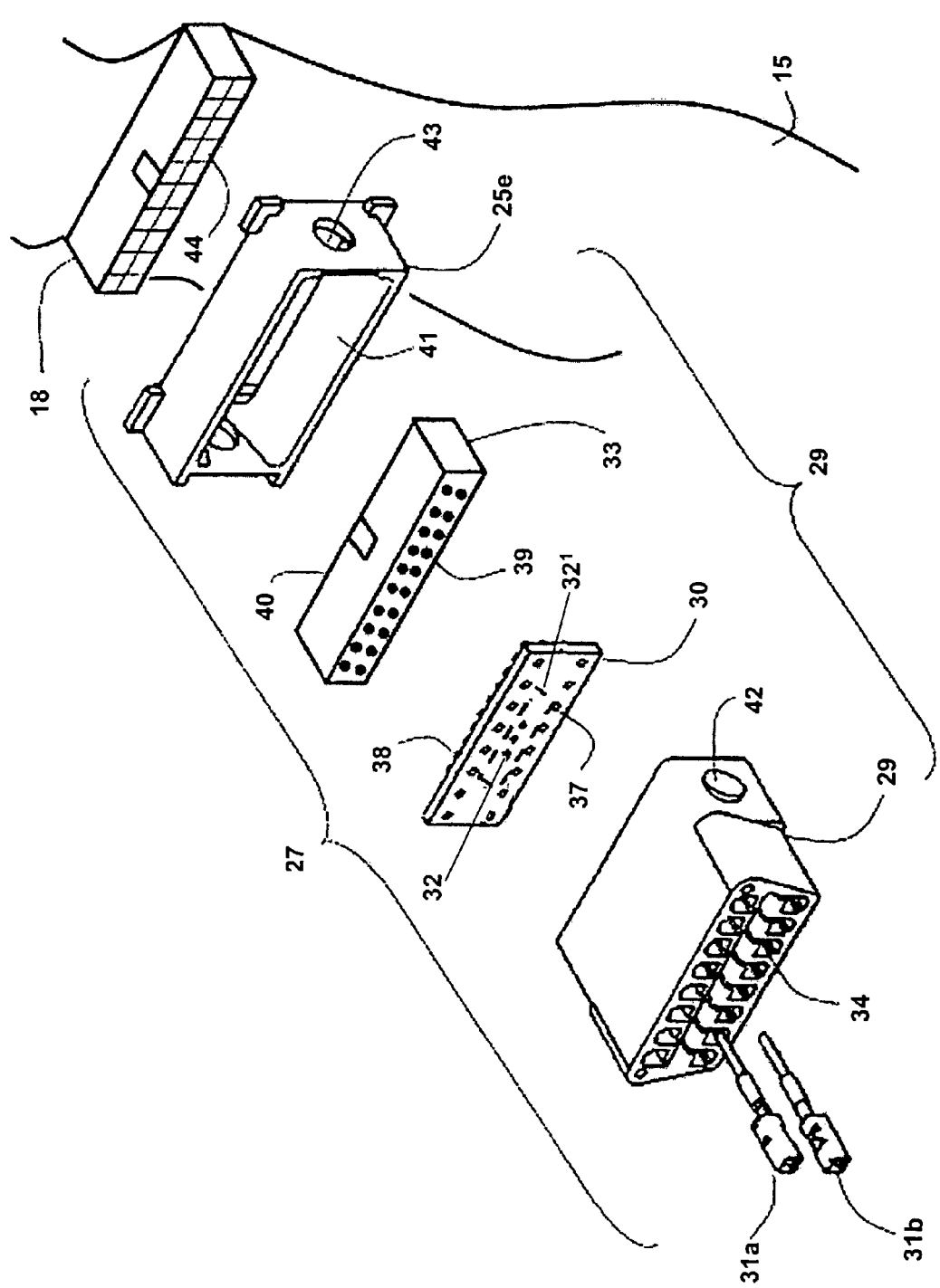
FIG. 2 is a three-dimensional, exploded side view of the effective OBD connector of the wiring harness of FIG. 1.

FIG. 2 shows a detailed, exploded view of an embodiment of an effective OBD connector 27, and provides one example of how this component may be connected to the first connector portion 18 of the cable 15. The effective OBD connector 27 in this embodiment features a snap-on adaptor 25e that replicates a configuration of the host vehicle's OBD connector 36; the adaptor in FIG. 2, for example, is common for many Toyota, Honda, and Chrysler vehicles. However, other adaptor configurations could be employed. In this embodiment, the adaptor 25e attaches to an outer perimeter of the connector core 26. A plastic core 29 located within the connector core 26 may have sixteen cavities 34, each filled with a single hollow metal pin 31a, 31b. The metal pins 31a, 31b extend through individual cavities 34 in the plastic core 29 and into a set of corresponding holes 37 formed through a printed circuit board 30. Once inserted, the ends of the hollow metal pins 31a, 31b define a plurality of metallized cavities for accepting a corresponding number and arrangement of metal pins.

In this embodiment, metal traces 32' etched on the printed circuit board 30 connect the set of holes 37 to a set of metal leads 38 on the board's opposite side. The set of metal leads 38 align with a set of pins 39 within an IDC connector 33. The set of pins 39 extend through the IDC connector and are exposed on its opposite side 40. During manufacturing, the metal pins 31a, 31b within the plastic core 29 are soldered to the corresponding holes 37 on one side of the printed circuit board 30. Metal leads 38 on the other side are then press-fit onto the set of pins 39 protruding from the IDC connector 33. This forms the core connector 26, which features a set of pins 40 extending from the IDC connector 33 that are in electrical contact with the cavities 34 within the plastic core 29. Other pin and connector arrangements could conceivably be employed without departing from the spirit and scope of the present invention.

Also in this embodiment, each adaptor 25e features an opening 41 that matches the geometry of the plastic core's perimeter. Similarly, each adaptor 25e includes a circular opening 43 on each side that matches a plastic boss 42 present on each side of the plastic core 26. Once the appropriate adaptor 25e is chosen, an installer inserts its opening 41 around the connector core 26, and snaps each circular opening 43 into the corresponding plastic boss 42. This firmly secures the adaptor 25e and the connector core 26, and results in an effective OBD connector 27 that matches that present in the vehicle. Other means of fastening the adapter to the core could be employed.

The installer then inserts the set of pins 40 extending from the opposite side of the connector core 26 into a set of cavities 44 within the first connector portion 18 connected to the cable 15 of the wiring harness. The cable 15 in this embodiment includes twenty wires. However, other types of cables may also be employed. After this, each cavity 34 in the plastic core 26 is in electrical contact with a corresponding wire within the cable 15. Upon completion of the installation, corresponding wires within the cable 15 are subsequently in electrical contact with: 1) a unique cavity on the effective OBD connector 27 (present underneath the vehicle's dash); 2) a corresponding cavity in the vehicle's original OBD connector (connected to the male OBD connector 28 of the wiring harness 10); and 3) to a corresponding pin on the telematics device (described in more detail below). In this configuration, the telematics device 20 can receive power and diagnostic data from basically any host vehicle 12, and then transmit this information through a wireless network to an Internet-accessible website as will be discussed in further detail below.

In addition, in this embodiment, the printed circuit board 30 includes a set of three metallized holes 32 that are insulated from any pins in the plastic core 29, but, following installation, are in electrical contact with a microprocessor in the telematics device 20. During operation, the microprocessor generates data indicating the status of the telematics device 20. The microprocessor can also accept new firmware. During maintenance, a special diagnostic tool plugs into the set of three metallized holes 32 and serially communicates with the microprocessor to either collect data or download new firmware into the device.

Figure 3:
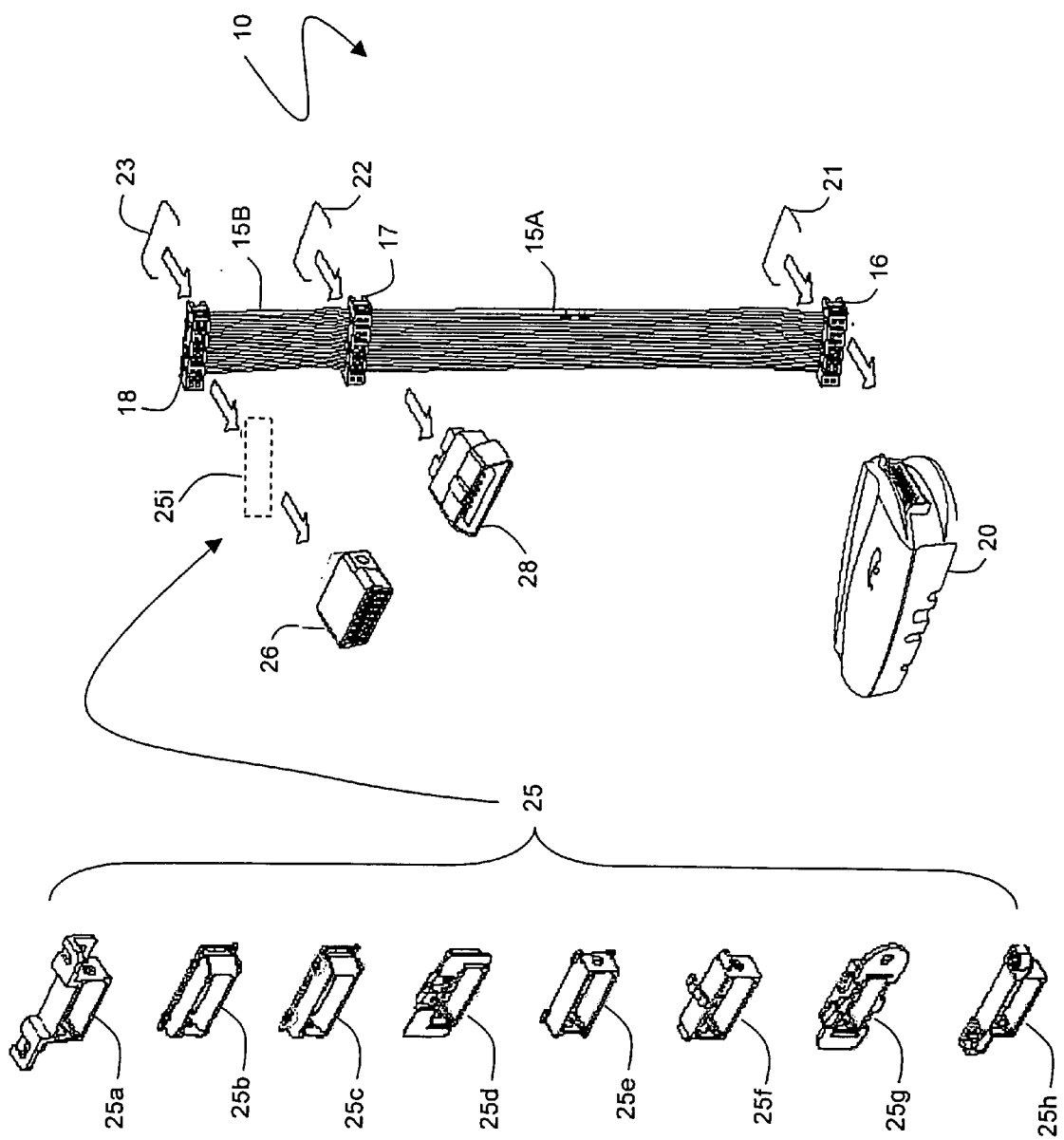
FIG. 3 is three-dimensional side view of the wiring harness of FIG. 1 featuring a first connector portion that connects to one of multiple adaptors, each matched to a different host vehicle's on-board diagnostic connector.

FIG. 3 illustrates in more detail the different configurations of snap-on adaptors 25 that can be used with the wiring harness 10 and telematics device 20 according to one embodiment of the invention. Other means of affixing the adapters 25 to the cores 26 could conceivably be employed. In this embodiment, each adaptor includes a common opening (41 in FIG. 2) and circular opening (43 in FIG. 3), but otherwise has a unique form factor. As is clear from the figure, the form factors may vary considerably; each is chosen to match that of an OBD connector present in a given vehicle. During installation, a single snap-on adaptor 25i selected from the set of different adaptors 25 connects to the connector core 26 as described above to complete the wiring harness 10. The wiring harness 10 then connects the telematics device 20 to the vehicle as described above. By the way of example, Table 1, below, correlates individual adaptors 25*a-h* within the set of snap-on adaptors 25 to their corresponding vehicle.

TABLE 1 snap-on adaptors and their corresponding host vehicles

| Adaptor | Host Vehicle |
|---|---|
| 25a | Ford |
| 25b | Toyota, Honda, Chrysler |
| 25c | Toyota, Chrysler |
| 25d | Saturn, General Motors |
| 25e | Mercedes, BMW |
| 25f | Porsche, Audi, Volkswagen |
| 25g | Volvo |
| 25h | Saab |

Figure 4:
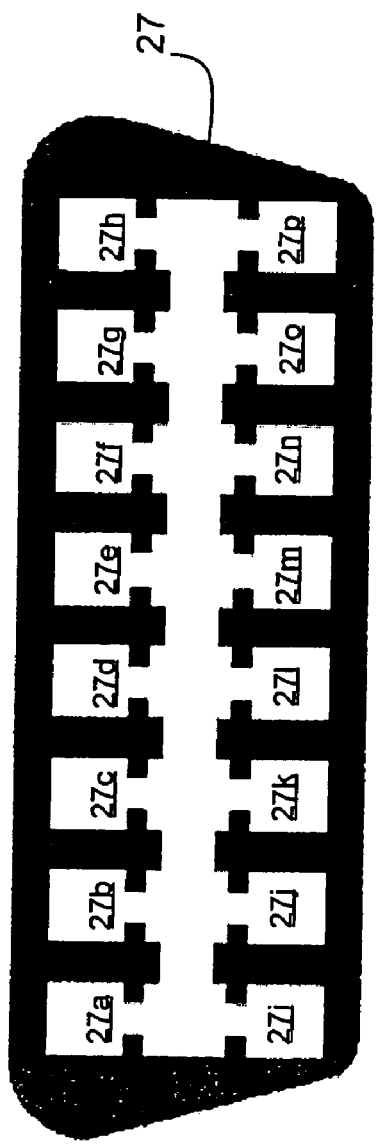
FIG. 4 is a front view of an effective OBD connector of FIG. 2 used for light-duty vehicles.

FIG. 4 illustrates each of the sixteen cavities 27*a-p* within the effective OBD connector 27 of this embodiment. As shown in Table 2, below, the cavities may supply power (~12V), ground, and a serial interface to one of five serial vehicle-communication protocols currently supported by the host vehicle and described above. Through these protocols the connector 27 receives data from the vehicle's ECU that characterize the on-board electrical, mechanical, and emissions systems.

TABLE 2 cavities within the effective OBD connector and their function

| Cavity | Function |
|---|---|
| 27b | J1850+ |
| 27d | Chassis Ground |
| 27e | Signal Ground |
| 27f | CAN High |
| 27g | ISO 9141-2 K Line |
| 27j | J1850– |
| 27n | CAN Low |
| 27o | ISO 9141-2 L Line |
| 27p | Battery Power (~12 V) |

A version of the wiring harness described above can also be used for heavy-duty trucks. These vehicles are typically not OBD-compliant, and support serial communication protocols (referred to herein as J1708/J1587 and CAN) that are different than those described above for light-duty vehicles. Like light-duty vehicles, however, these serial communication protocols collect diagnostic data, generated from a in-vehicle network of sensors, from the host vehicle's ECU. These data are typically made available through a circular six or nine-pin connector typically located in the truck's interior. Unlike light-duty vehicles, the form factors of these connectors typically do not vary in a vehicle-by-vehicle manner.

Figure 5B:
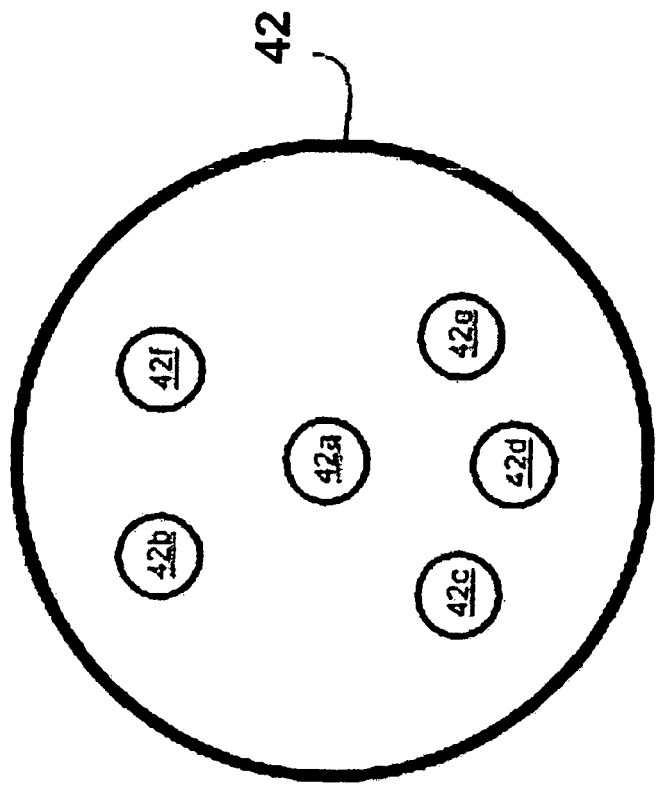
FIGS. 5A and 5B are front views of effective connectors used, respectively, for heavy-duty vehicles supporting six-pin connectors, and heavy-duty vehicles supporting nine-pin connectors.
Figure 5A:
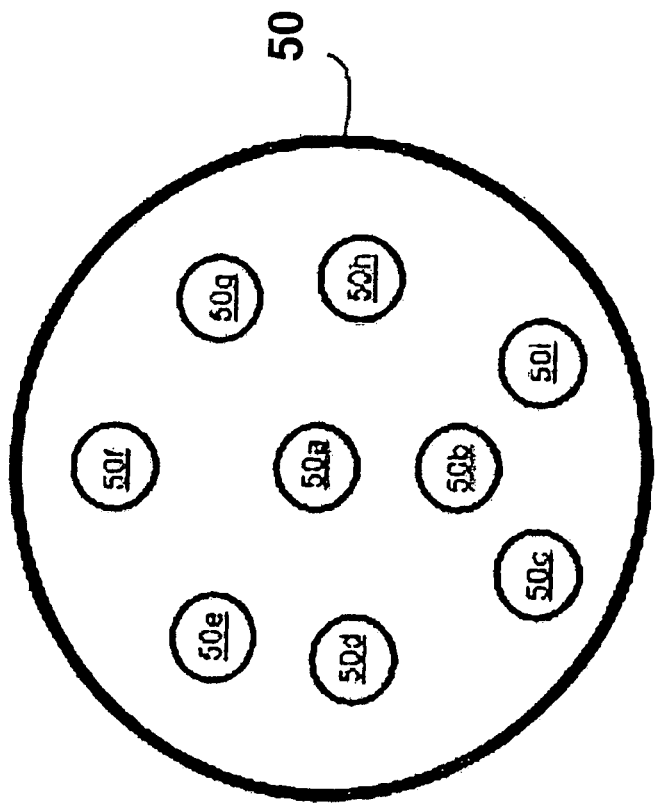

The wiring harness heavy-duty trucks is similar to that described above with reference to FIGS. 1-3. In this case, however, different core connectors, each having a circular cross section, are required for the six and nine-pin configurations. FIGS. 5A and 5B show, respectively, cross-sections of the nine-pin 50 and six-pin 42 connectors, and the cavities 42*a-e*, 50*a-i* within these connectors. Examples of typical pin-outs for the effective connectors for these configurations are described in more detail in Tables 3 and 4, below:

TABLE 3 cavities and their function for the effective connector for a heavy-duty truck featuring a nine-pin connector

| Cavity | Function |
|---|---|
| 50a | Chassis Ground |
| 50b | Battery Power (~12 V) |
| 50c | CAN High |
| 50d | CAN Low |
| 50e | CAN Shield |
| 50f | J1708+ |
| 50g | J1708– |
| 50h | Proprietary |
| 50i | Proprietary |

TABLE 4 cavities and their function for the effective connector for a heavy-duty truck featuring a six-pin connector

| Cavity | Function |
|---|---|
| 42a | J1708+ |
| 42b | J1708– |
| 42c | Battery Power (~12 V) |
| 42d | No Standard Function |
| 42e | Chassis Ground |
| 42f | No Standard Function |

Figure 6:
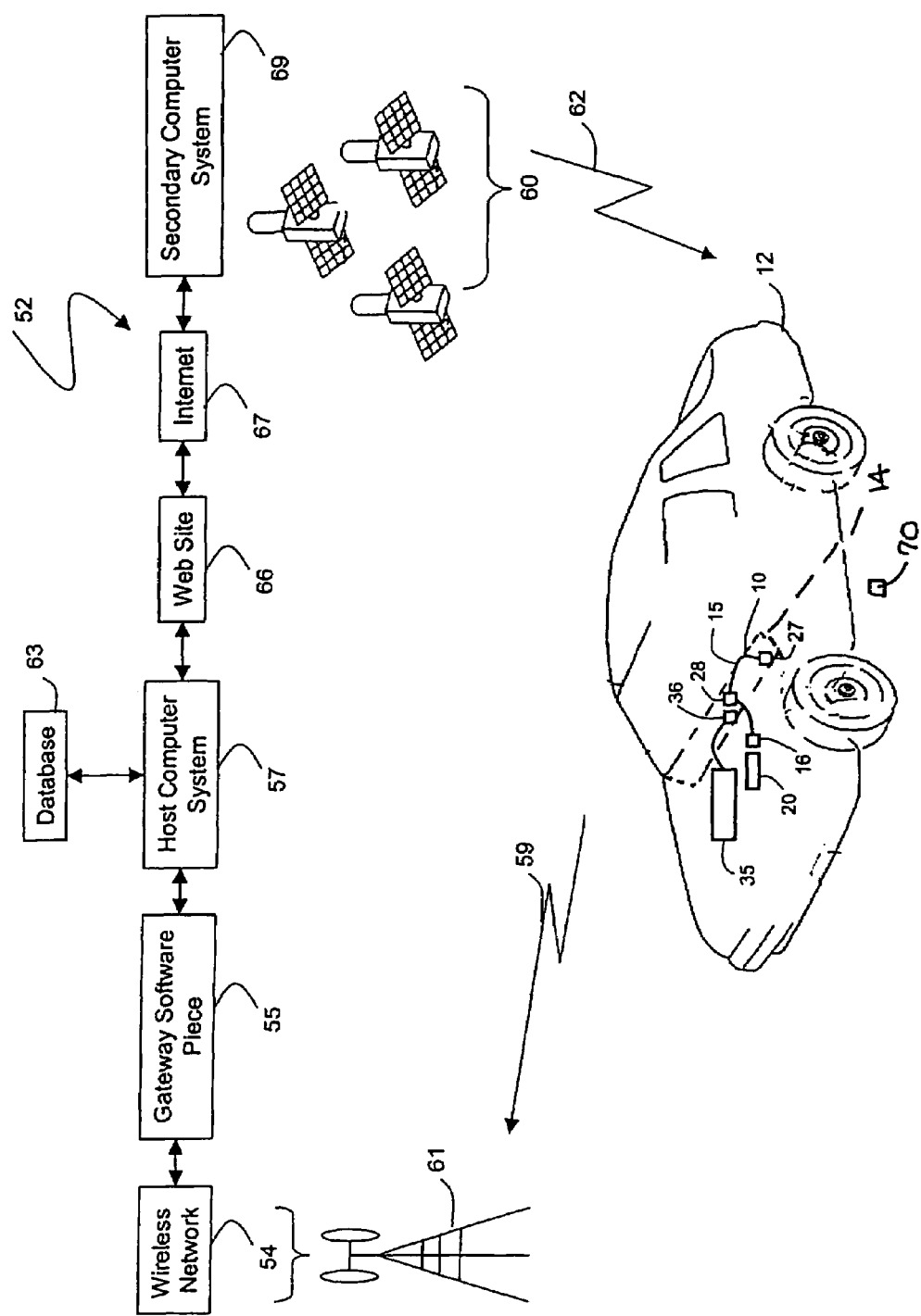
FIG. 6 is a schematic drawing of a telematics system for collecting and transmitting diagnostic and location information from a vehicle that uses the wiring harness of FIG. 1.

FIG. 6 shows a schematic drawing of a telematics system 52 that uses embodiments of the above-described telematics device 20 and wiring harness 10 to monitor diagnostic and location-based information from a host vehicle 12. The telematics device 20 connects to the wiring harness 10 through a third connector portion 16, and the resulting system is installed in a host vehicle 12 as described above. Specifically, the wiring harness 10 includes a cable 15 that, on one end, features an effective OBD connector 27 that is located under the vehicle's dash 14. This effective OBD connector 27 may populate a slot or other mounting arrangement left behind by the vehicle's original OBD connector 36, which is removed from its original location during installation and connected to a male sixteen-pin connector 28 attached to the wiring harness 10. The vehicle's original connector 36 provides a serial interface to the vehicle's ECU 35.

During operation, the telematics device 20 retrieves diagnostic data collected from the host vehicle 12, and location-based data from a GPS that collects signals from a constellation 60 of overlying satellites through an airlink 62. The device 20 formats these data in separate packets and transmits them over an airlink 59 to a base station 61 included in a wireless network 54. The packets propagate through the wireless network 54 to a gateway software piece 55 running on a host computer system 57. The host computer system 57 processes and stores information from the packets in a database 63 using the gateway software piece 55. The host computer system 57 additionally hosts a web site 66 that, once accessed, displays the information. A user (e.g. an individual working for a call center) accesses the web site 66 with a secondary computer system 69 through the Internet 67. The host computer system 57 includes a data-processing component 68 that analyzes the location and diagnostic information as described above.

Other embodiments are also within the scope of the invention. In particular, cables, connectors, and mechanical configurations other than those described above can be used for the wiring harness. For example, the harness can have a 'Y' configuration where the effective OBD connector, male OBD connector, and third connector portion are, respectively, at different ends of the 'Y'. In another configuration, the telematics device can include a pass-through connector so that the device can receive diagnostic data while making the vehicle's OBD connector available to a scan tool during, for example, repairs. When the scan tool 70 is plugged in, the telematics device 'backs off' the ECU (i.e., the telematics device temporarily stops accessing data from the ECU) using either firmware or hardware, so that the scan tool 70 can read the diagnostic data.

Figure 7:
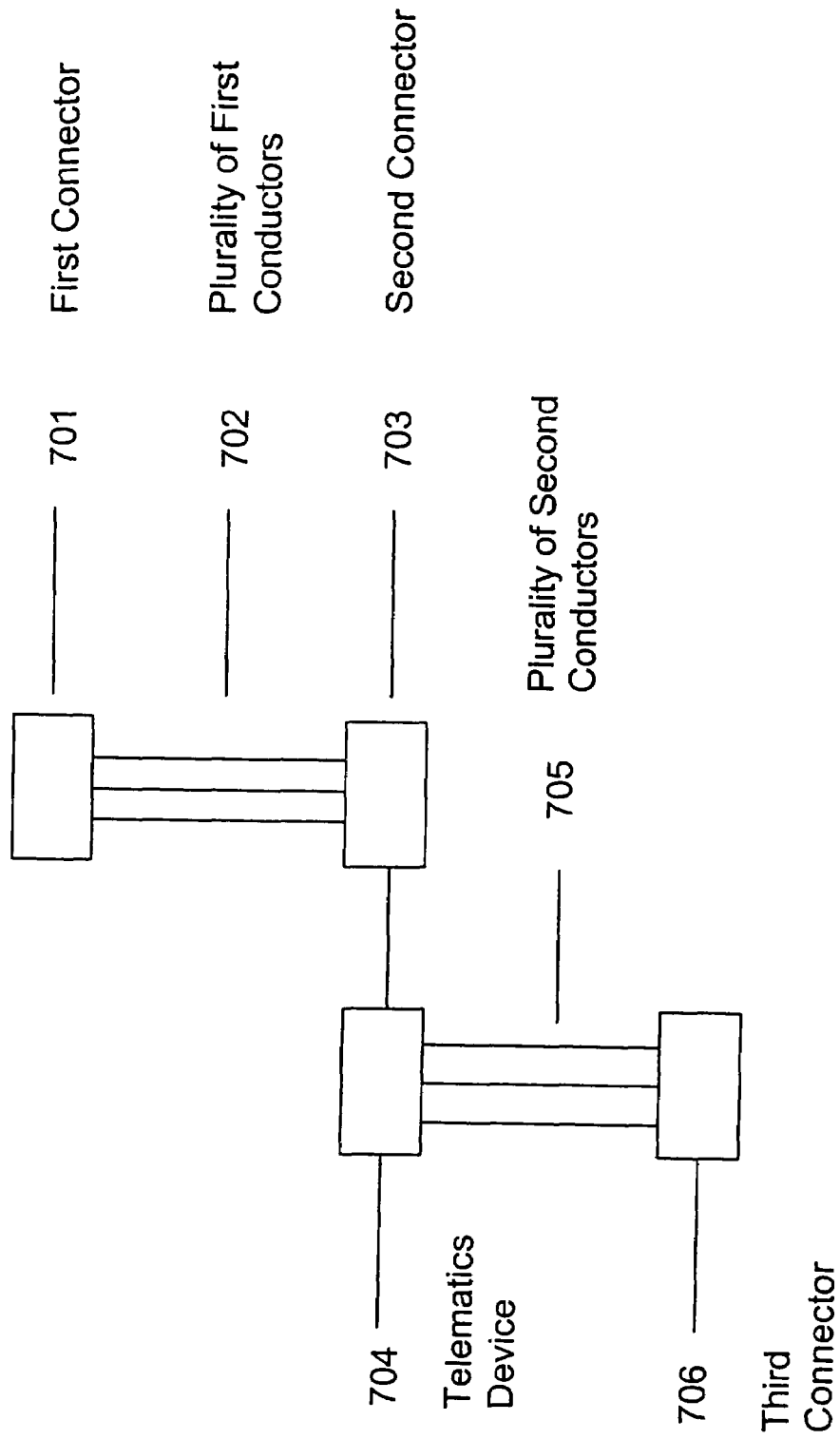
FIG. 7 is a schematic drawing of an alternate embodiment of the wiring harness of FIG. 1.

FIG. 7, for example, shows an embodiment as a wiring harness arrangement for connecting a telematics device 704 to a host vehicle, comprising: a plurality of first electrical conductors 702; a first connector 701 electrically coupled to at least some of the first electrical conductors 702 and being configured to be connected to an in-vehicle diagnostic system; and a second connector 703 electrically coupled to at least one of the first electrical conductors 702 and configured to be coupled to the telematics device 704; a plurality of second electrical conductors 705, configured to be connected to the telematics device 704; and a third electrical connector 706 electrically coupled to at least some of the second electrical conductors 705 and being configured to be coupled to a diagnostic scan tool.

Figure 8:
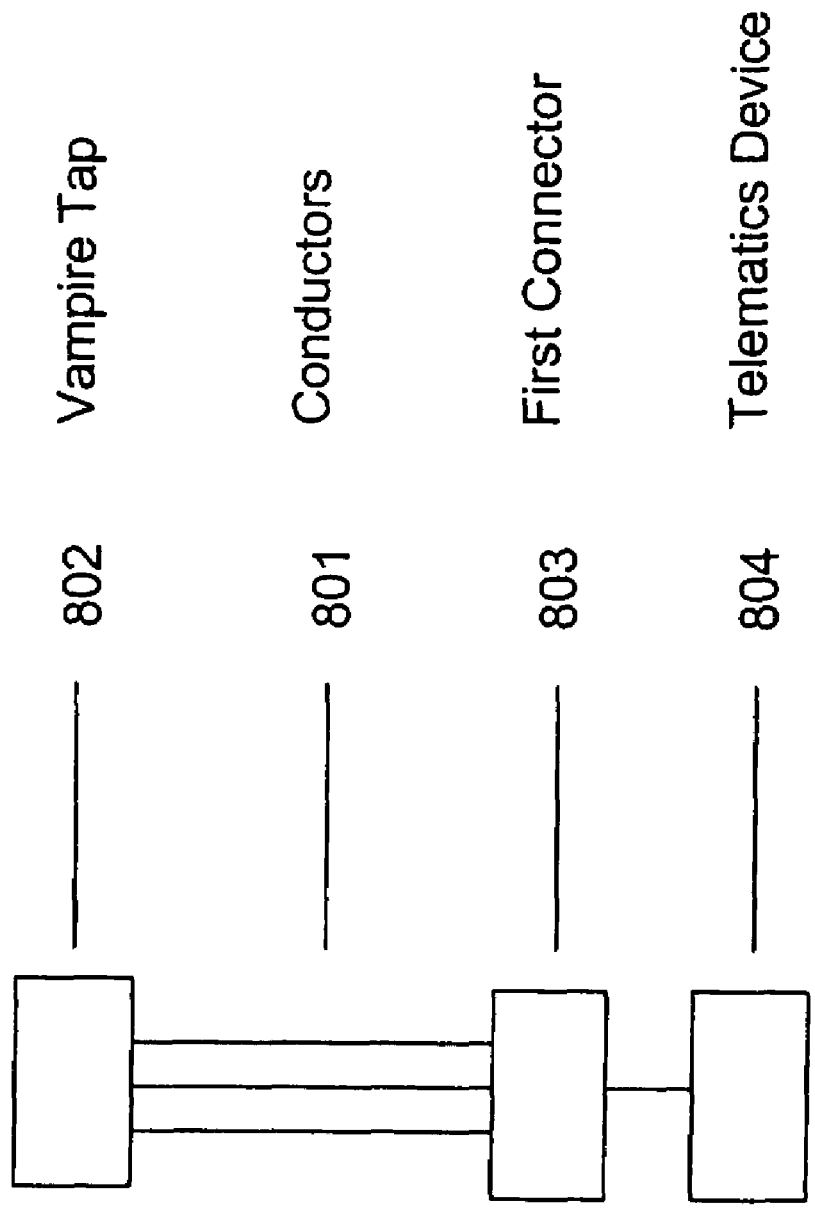
FIG. 8 is a schematic drawing of an alternate embodiment of the wiring harness of FIG. 1 featuring a "vampire tap" for making an electrical connection between the host vehicle's OBD system and the telematics device.

In other embodiments, the wiring harness can include 'vampire taps' that connect directly to wires within the vehicle's OBD system. In this case, the original OBD connector within the vehicle is not removed, and the wiring harness therefore lacks an effective OBD connector. Instead, the appropriate wires from the OBD system (e.g., wires providing high and low serial communication) are located and connected to corresponding wires within the wiring harness using the taps. These wires connect directly to the telematics device, and supply diagnostic data that is processed as described above. This embodiment, shown in FIG. 8, includes a wiring harness arrangement for connecting a telematics device 804 to a host vehicle, comprising: a plurality of conductors 801; a set of vampire taps 802 electrically coupled to at least some of the electrical conductors 801 and being configured to be connected to an in-vehicle diagnostic system; and a first connector 803 electrically coupled to at least one of the electrical conductors 801 and configured to be coupled to the telematics device 804.

Figure 9:
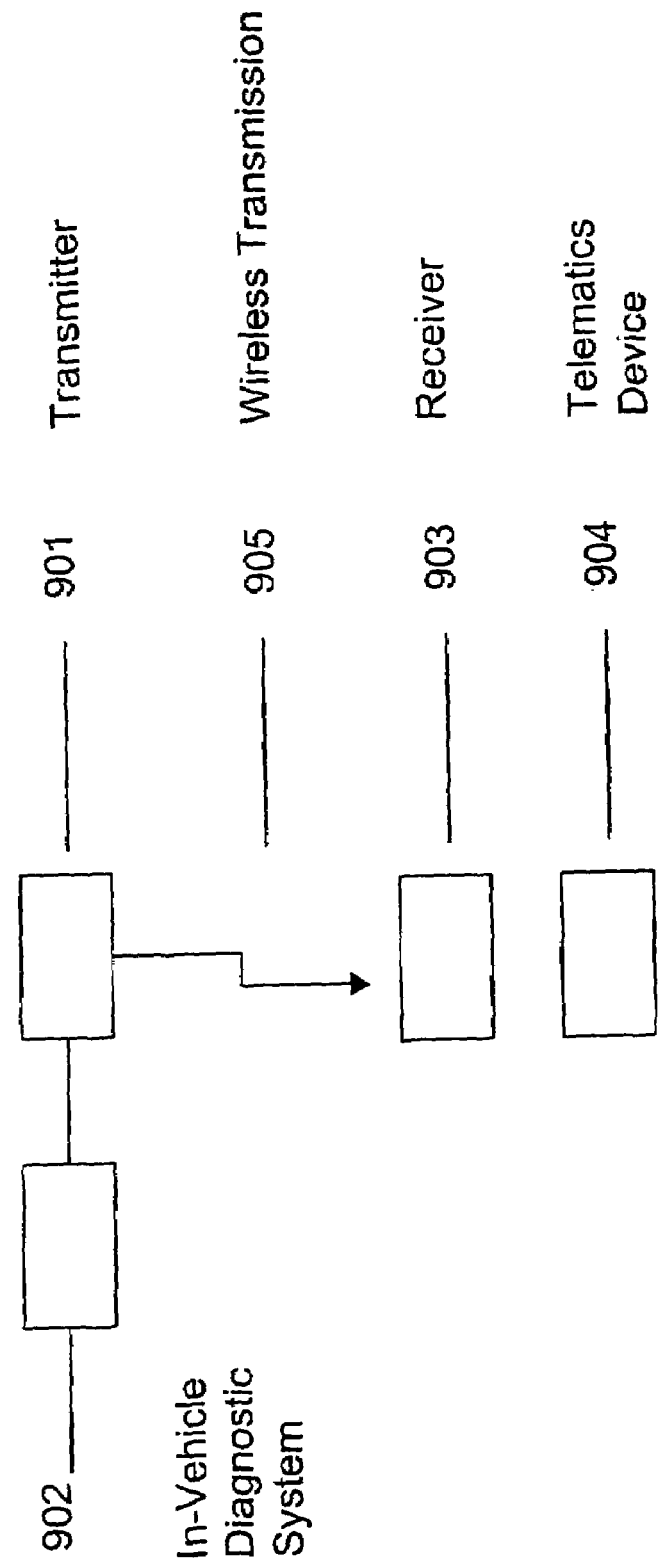
FIG. 9 is a schematic drawing of an alternate embodiment of the wiring harness of FIG. 1 featuring a wireless interface between the host vehicle's OBD system and the telematics device.

In other embodiments, short-range wireless devices, such as Bluetooth™ or 802.11-based devices, can be used in place of cables to transmit diagnostic and location data to the in-vehicle device. For example, a Bluetooth™ transmitter can be connected to the vehicle's OBD system, and wirelessly transmit diagnostic data to a corresponding Bluetooth™ receiver in the telematics device. The telematics device then transmits these data over a nation-wide wireless network using a conventional wireless transmitter. This embodiment shown in FIG. 9, features a system for connecting a telematics device 904 to a host vehicle, comprising: a short-range wireless transmitter 901 connected to an in-vehicle diagnostic system 902; and a short-range wireless receiver 903 connected to the telematics device 904 installed in the host vehicle; wherein the transmitter 901 is configured to wirelessly transmit 905 diagnostic data to the receiver 903.

In still other embodiments, the snap-on adaptors, connector portions, cabling, and pins can have different configurations than those shown above. The telematics system shown in FIG. 6 in vehicle 12 may also be implemented in communication with other hardware and software systems different than or in addition to those shown 61, 54, 55, 57, 63, 66, 67, 52, 69, 60 in that figure. Such other hardware and software systems are described, for example, in the following references, the disclosures of which have been previously incorporated herein by reference: 1) U.S. Pat. No. 6,594,579; 2) U.S. Pat. No. 6,604,033; 3) U.S. Pat. No. 6,611,740; and 4) U.S. Pat. No. 6,636,790.

In general, it will be apparent to one of ordinary skill in the art that some of the embodiments as described hereinabove may be implemented in many different embodiments of software, firmware, and hardware in the entities illustrated in the figures. The actual software code or specialized control hardware used to implement some of the present embodiments is not limiting of the present invention. Thus, the operation and behavior of the embodiments are described without specific reference to the actual software code or conventional hardware components. The absence of such specific references is feasible because it is clearly understood that artisans of ordinary skill would be able to design software and control hardware to implement the embodiments of the present invention based on the description herein with only a reasonable effort and without undue experimentation.

It is to be understood that the figures and descriptions of the present invention have been simplified to illustrate elements that are relevant for a clear understanding of the present invention, while eliminating, for purposes of clarity, other elements. Those of ordinary skill in the art will recognize that these and other elements may be desirable. However, because such elements are well known in the art, and because they do not facilitate a better understanding of the present invention, a discussion of such elements is not provided herein.

In some embodiments of the present invention disclosed herein, a single component can be replaced by multiple components, and multiple components replaced by a single component, to perform a given function or functions. Except where such substitution would not be operative to practice embodiments of the present invention, such substitution is within the scope of the present invention.

What is claimed is:

1. A method for collecting data relating to a vehicle having a telematics unit which receives at least a portion of the data from an engine control unit, the method comprising:
   detecting downloading of the data, wherein the data is downloaded through an on-board diagnostic connector; and
   discontinuing receipt of the data by the telematics unit when the downloading is detected.

2. The method of claim 1 wherein the vehicle has an onboard diagnostic connector communicating with the engine control unit and wherein said downloading comprises coupling a scan tool to the onboard diagnostic connector.

3. The method of claim 2 further comprising:
   decoupling the scan tool from the onboard diagnostic connector after a desired amount of data has been downloaded to the scan tool; and
   enabling the telematics unit to receive data from the engine control unit.

4. A telematics unit having instructions stored thereon which when executed:
   receive data from an engine control unit communicating therewith;
   detect downloading of data to a scan tool communicating with the engine control unit; and
   discontinue receipt of the data upon the detecting the downloading of diagnostic data to the scan tool.

5. A telematics unit comprising:
   means for receiving data transmitted by an engine control unit;

means for detecting downloading of data from the engine control unit to a scan tool; and means for discontinuing receipt of the engine control unit transmitted data by the means for receiving during the downloading of the data to the scan tool.

6. A computer readable medium having instructions stored thereon which when executed by a processor, cause the processor to:

enable a telematics unit to receive data from an engine control unit;

detect when the engine control unit is downloading data to a scan tool; and discontinue receipt of the engine control unit transmitted data by the telematics unit during the downloading of data from the engine control unit to the scan tool.

* * * * *